(12) United States Patent
Tayama et al.

(10) Patent No.: US 8,934,671 B2
(45) Date of Patent: Jan. 13, 2015

(54) TRAFFIC LINE CREATION DEVICE AND TRAFFIC LINE CREATION METHOD

(75) Inventors: Tetsuo Tayama, Fukuoka (JP); Mikio Morioka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 32 days.

(21) Appl. No.: 13/639,655

(22) PCT Filed: Jan. 7, 2011

(86) PCT No.: PCT/JP2011/000030
§ 371 (c)(1),
(2), (4) Date: Oct. 5, 2012

(87) PCT Pub. No.: WO2011/145236
PCT Pub. Date: Nov. 24, 2011

(65) Prior Publication Data
US 2013/0022246 A1   Jan. 24, 2013

(30) Foreign Application Priority Data

May 21, 2010   (JP) .................................. 2010-117284

(51) Int. Cl.
*G06K 9/00* (2006.01)
*G06T 7/20* (2006.01)

(52) U.S. Cl.
CPC ......... *G06T 7/20* (2013.01); *G06T 2207/30241* (2013.01); *G06T 2207/30196* (2013.01); *G06K 9/00798* (2013.01)
USPC .......................................... 382/103; 382/100

(58) Field of Classification Search
None
See application file for complete search history.

(56) References Cited

FOREIGN PATENT DOCUMENTS

| CN | 1770204 | 5/2006 |
|---|---|---|
| CN | 101465033 | 6/2009 |
| JP | 05-006434 | 1/1993 |
| JP | 09-130784 | 5/1997 |
| JP | 2000-268173 | 9/2000 |
| JP | 2008-97359 | 4/2008 |
| JP | 4429337 | 3/2010 |
| WO | 2008/045144 | 4/2008 |

OTHER PUBLICATIONS

Zhang et al ("Detection and Tracking of Multiple Humans with Extensive Pose Articulation", IEEE 2007).*
Notification of Transmittal of Translation of the International Preliminary Report on Patentability for PCT/JP2011/000030, mailed Dec. 20, 2012.

(Continued)

*Primary Examiner* — Avinash J Yentrapati
(74) *Attorney, Agent, or Firm* — Greenblum & Bernstein, P.L.C.

(57) ABSTRACT

The traffic line creation device which creates the traffic line representing a motion trace of the tracking target comprising: an object detection unit which detects the tracking target from an image frame to create detection result information including a detected area of the tracking target; a state determination unit which determines a state of the tracking target based on the detection result information; a reference point creation unit which creates a reference point of the tracking target by using the detected area with a method corresponding to the state determined at the state determination unit; and a traffic line creation unit which creates the traffic line representing a motion trace of the tracking target by connecting a plurality of the reference points created for a plurality of the image frames.

11 Claims, 16 Drawing Sheets

(56) References Cited

OTHER PUBLICATIONS

Xu Lei et al., "Research and Realization on Moving Object Detection and Tracking Methods of Human", Modern Electronics Technique, vol. 33 Issue 4, 2010, pp. 128-131 with English Abstract.
N. Thome et al., "A robust appearance model for tracking human motions", IEEE Conference on Advanced Video and Signal Based Surveillance, 2005, pp. 528-533.
Yuhua Zheng et al., "The PSO-Based Adaptive Window for People Tacking", Proceedings of the 2007 IEEE Symposium on Computational Intelligence in Security and Defense Applications (CISDA 2007), 2007, pp. 23-29.
China Office action, dated Sep. 23, 2014 along with an English translation thereof.

* cited by examiner

Fig.3

| DETECTION TIME | DETECTION ID | DETECTED POSITION (LEFT-OVER COORDINATE) | FRAME WIDTH | FRAME HEIGHT |
|---|---|---|---|---|
| t | ID | $(x_0, y_0)$ | w | h |
| t1 | 1 | (123,450) | 30 | 50 |
| t1 | 2 | (350,180) | 25 | 40 |
| t2 | 1 | ⋮ | ⋮ | |
| ⋮ | ⋮ | ⋮ | ⋮ | |

Fig.5

| CLASS | AREA ON IMAGE |
|---|---|
| FLOOR REFLECTION | $(x-300)^2+(y-400)^2<1600$ |
| COVERED | $100<x<200$ and $250<y<350$ |
| ⋮ | ⋮ |

TRAFFIC LINE CREATION DEVICE AND TRAFFIC LINE CREATION METHOD

CROSS REFERENCE TO RELATED APPLICATION

This application claims the benefit of Japanese Patent Application No. 2010-117284 filed on May 21, 2010, which is incorporated herein by reference in its entirety.

TECHNICAL FIELD

The present invention relates to a traffic line creation device that detects a tracking target in an image and creates a traffic line representing a motion trace of the tracking target, and a method for creating the traffic line.

BACKGROUND ART

Conventionally, in order to record and analyze movements of workers in a factory and movements of shoppers in a store, traffic line creation devices that create a traffic line representing a motion trace of the tracking target have been used. For example, the traffic line creation device photographs a target space by a camera installed in a relatively higher place, recognizes a tracking target (for example, a person) from a photographed image, tracks it, and creates a traffic line.

As mentioned above, the traffic line is to track the position of the tracking target projected in the image in the target space. Therefore, a movement in a vertical direction (the y direction) of the tracking target within the image space represents a movement of the tracking target in a front direction or a depth direction viewed from the camera in the target space. Also, a movement in a lateral direction (the x direction) of the tracking target within the image space represents a movement of the tracking target in a left or right direction viewed from the camera in the target space.

For example, in the conventional traffic line creation device, in order to create a traffic line, the traffic line is created by recognizing a tracking target in the image, creating rectangular frames including the tracking target, and connecting the center points of the frames in a constant time interval (for example, see Patent Literature 1).

CITATION LIST

Patent Literature

Patent Literature 1: JP 4429337 B1

SUMMARY OF INVENTION

Technical Problem

When the tracking target is a person, however, there is a case where, although the standing point of the person in the target space is not in a move, the center point of the frame moves within the image space. Therefore, when the traffic line is always created by tracking the center point of the frame, the traffic line may be created by the movement of the center point which is unnecessary for tracking the standing point of the person in the target space. Accordingly, the traffic line accurately representing the actual movement of the person in the target space may not be created.

For example, when the person crouches, while the standing point of the person does not change, the rectangular frame including the person becomes smaller vertically. In response, the center point of the rectangle moves downward within the image space. Creation of the traffic line reflecting such movement of the center point may cause the creation of a traffic line representing that the person has moved in the front direction viewed from the camera within the target space. Likewise in other cases where the person spreads its arm or a part of the person is covered by a covering object, the traffic line accurately representing the actual movement of the person in the target space may not be created.

Although the above problem can be solved by creating a traffic line with utilizing an image recognition technique to recognize the gesture of the person such as "crouching" and "spreading its arm", this causes the heavier processing load.

The present invention has been made to solve the problem in the conventional art and intends to provide a traffic line creation device and a traffic line creation method that can, without increasing the processing load, reduce the incorrect creation of the traffic line such as the creation of the traffic line which does not accurately reflect the movement of the tracking target.

Solution to Problem

According to the present invention, a traffic line creation device for creating a traffic line representing a motion trace of a tracking target includes:

an object detection unit which detects the tracking target from an image frame to create detection result information including a detected area of the tracking target;

a state determination unit which determines a state of the tracking target based on the detection result information;

a reference point creation unit which creates a reference point of the tracking target by using the detected area with a process corresponding to the state determined at the state determination unit; and a traffic line creation unit which creates a traffic line representing the motion trace of the tracking target by connecting a plurality of the reference points created for a plurality of the image frames.

According to another aspect of the present invention, a traffic line creation method for creating a traffic line representing a motion trace of a tracking target includes:

an object detection step which detects the tracking target from an image frame to create detection result information including a detected area of the tracking target;

a state determination step which determines a state of the tracking target based on the detection result information;

a reference point creation step which creates a reference point of the tracking target by using the detected area with a process corresponding to the state determined at the state determination step; and a traffic line creation step which creates a traffic line representing the motion trace of the tracking target by connecting a plurality of the reference points created for a plurality of the image frames.

Advantageous Effects of Invention

Without increasing the processing load, the present invention can reduce the incorrect creation of the traffic line such as the creation of the traffic line which does not accurately reflect the movement of the tracking target.

As described below, there are other embodiments of the present invention. Therefore, the disclosure of the present invention intends to provide a part of the present invention and thus does not intend to limit the scope of the invention described and claimed herein.

BRIEF DESCRIPTION OF THE DRAWINGS

FIG. 3 is a diagram showing an example of detection result information in the embodiment of the present invention.

FIG. 5 is a diagram showing an example of environment information stored in an environment database in the embodiment of the present invention.

DESCRIPTION OF EMBODIMENTS

Figure 1:
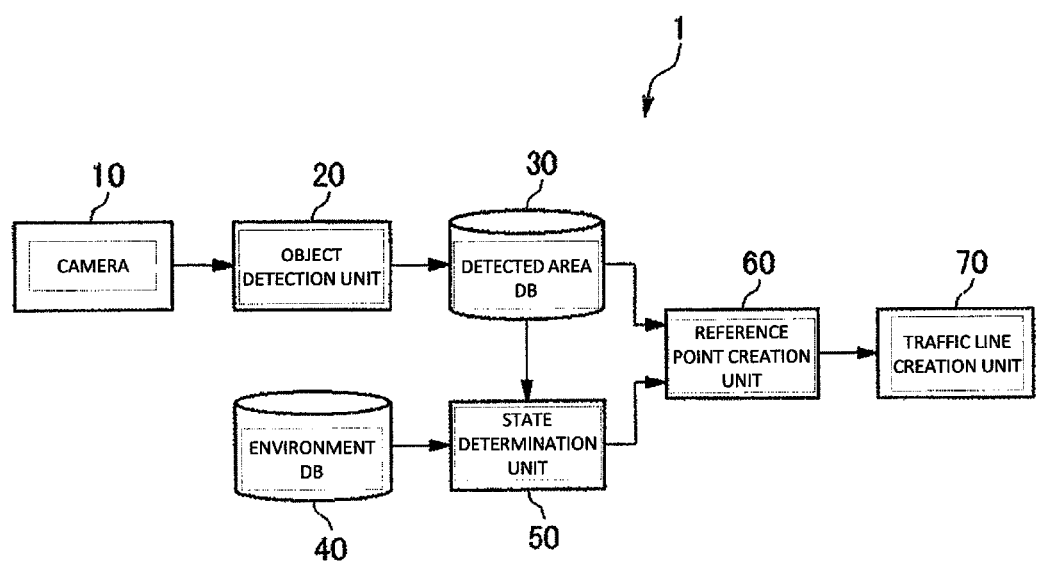
FIG. 1 is a block diagram of a traffic line creation device according to an embodiment of the present invention.

The detailed description of the present invention will be provided below. The embodiments described below are mere examples of the present invention, and therefore the present invention can be modified in various ways. Thus, the specific configurations and functions disclosed below are not intended to limit the scope of the claims.

A traffic line creation device according to the embodiment of the present invention is a traffic line creation device for creating a traffic line representing a motion trace of a tracking target. The device has: an object detection unit which detects a tracking target from an image frame to create detection result information including a detected area of the tracking target; a state determination unit which determines a state of the tracking target based on the detection result information; a reference point creation unit which creates a reference point of the tracking target by using the detected area with a process corresponding to the state determined at the state determination unit; and a traffic line creation unit which creates a traffic line representing a motion trace of the tracking target by connecting a plurality of the reference points created for a plurality of the image frames.

This configuration allows for the creation of the reference point of the tracking target by the process corresponding to the state of the tracking target, which can reduce the incorrect creation of the traffic line such as the creation of the traffic line which does not accurately reflect the movement of the tracking target. Further, since the state of the tracking target is determined based on the detection result information including the detected area, the processing load can be suppressed compared to the case where the gesture of the tracking target is recognized.

Further, in the above traffic line creation device, the state determination unit determines the state of the tracking target based on a change in the detected area.

This configuration allows for the determination as to whether it is in response to the movement of the tracking target that the detected area has changed or it is in response to the change in the state of the tracking target that the detected area has changed.

Further, in the above traffic line creation device, the state determination unit determines the state of the tracking target based on a positional relationship of environment information set in a target space for a traffic line creation and the detected area.

This configuration allows for the determination as to whether it is in response to the movement of the tracking target that the detected area has changed or it is because the tracking target is in the position to which the environment information is set that the detected area has changed.

Further, in the above traffic line creation device, when a particular state other than a normal state is determined at the state determination unit, the reference point creation unit uses a current and a past detected areas to create the reference point.

This configuration allows a part of the past detected area to be used in substitution for the current detected area when there is a part for which it is inappropriate to use the current detected area in the detected area to be used for creating the reference point.

Further, in the above traffic line creation device, the object detection unit creates a rectangular frame, as the detected area, comprising an upper line, a lower line, a right line, and a left line and including a detected tracking target.

This configuration allows the detected area to be easily generated using the maximum values of respective coordinate values in the x axis direction and the y axis direction of the area detected as the tracking area, which can reduce the processing load.

Further, in the above traffic line creation device, the state determination unit compares a current rectangular frame with a past rectangular frame. If a movement of a lower line is less than a first threshold and a downward movement of an upper line is greater than a second threshold, the state determination unit determines that a crouching state occurs. When a crouching state is determined at the state determination unit, the reference point creation unit employs an upper line of the past rectangular frame as the upper line of the rectangular frame to create a reference point.

According to this configuration, even when the detected area has changed due to the gesture of crouching without accompanying the movement of the tracking target, this change in the detected area does not cause the change in the reference point, which can prevent the incorrect creation of the traffic line such as the creation of the traffic line which does not accurately reflect the movement of the tracking target.

Further, in the above traffic line creation device, the state determination unit compares a current rectangular frame with a past rectangular frame If movements of an upper line and an lower line are less than a third threshold and a rightward movement of a right line or a leftward movement of a left line is greater than a fourth threshold, the state determination unit determines that a spreading arm state occurs. When a spreading arm state is determined at the state determination unit, the reference point creation unit employs a right line or a left line of the past rectangular frame as the right line or a left line of the rectangular frame to create a reference point.

According to this configuration, even when the detected area has changed due to the gesture of spreading the arm without accompanying the movement of the tracking target, this change in the detected area does not cause the change in the reference point, which can prevent the incorrect creation of the traffic line such as the creation of the traffic line which does not accurately reflect the movement of the tracking target.

Further, in the above traffic line creation device, if at least one end of a lower line of a rectangular frame of a current detection result information is included in a floor reflection area set in a target space for a traffic line creation, the state determination unit determines that a floor reflection state occurs. When the floor reflection state is determined at the state determination unit, the reference point creation unit employs a lower line of a rectangular frame of a past detection result information as the lower line of the rectangular frame to create a reference point.

According to this configuration, even when the detected area has changed because the tracking target has entered the floor reflection area and its reflected image has been created, this change in the detected area does not cause the change in the reference point, which can prevent the incorrect creation of the traffic line such as the creation of the traffic line which does not accurately reflect the movement of the tracking target.

Further, in the above traffic line creation device, if a lower line of a rectangular frame of a current detection result information is included in a covered area set in a target space for a traffic line creation, the state determination unit determines that a covered state occurs. When a covered state is determined at the state determination unit, the reference point creation unit employs a lower line of a rectangular frame of a past detection result information as the lower line of the rectangular frame to create a reference point.

According to this configuration, even when the detected area has changed because the tracking target has moved rearward in the covered area and the image has been covered with respect to the camera, this change in the detected area does not cause the change in the reference point, which can prevent the incorrect creation of the traffic line such as the creation of the traffic line which does not accurately reflect the movement of the tracking target.

Further, in the above traffic line creation device, if a state does not correspond to a particular state other than a normal state but an aspect ratio or a size of a rectangular frame of a detection result information changes over a fifth threshold, the state determination unit determines that a noise state occurs. When a noise state is determined at the state determination unit, the reference point creation unit averages a plurality of the rectangular frames in a period determined to be a noise state to create a reference point.

According to this configuration, when there is an unidentified change in the rectangular frame, it is determined that there is a noise and the rectangular frames during this period are averaged, which can prevent the creation of the traffic line which reflects the noise as it is.

Another embodiment of the present invention is a traffic line creation method for creating a traffic line representing a motion trace of a tracking target that includes: an object detection step which detects a tracking target from an image frame to create detection result information including a detected area of the tracking target; a state determination step which determines a state of the tracking target based on the detection result information; a reference point creation step which creates a reference point of the tracking target by using the detected area with a process corresponding to the state determined at the state determination step; and a traffic line creation step which creates a traffic line representing a motion trace of the tracking target by connecting a plurality of the reference points created for a plurality of the image frames.

As is the case in the above traffic line creation device, this configuration also allows for the creation of the reference point of the tracking target by the process corresponding to the state of the tracking target, which can reduce the incorrect creation of the traffic line such as the creation of the traffic line which does not accurately reflect the movement of the tracking target. Further, since the state of the tracking target is determined based on the detection result information including the detected area, the processing load can be suppressed compared to the case where the gesture of the tracking target is recognized.

Hereafter, the traffic line creation device of the embodiments of the present invention will be described by using the drawings.

FIG. 1 shows a traffic line creation device of the first embodiment of the present invention. In FIG. 1, the traffic line creation device 1 of the embodiment of the present invention comprises a camera 10, an object detection unit 20, a detected area database 30, an environment database 40, a state determination unit 50, a reference point creation unit 60, and a traffic line creation unit 70.

The camera 10 comprises modules such as a lens, an image pickup element, and so on that are necessary for photographing the target. In order to photographing a space for which the traffic line is created (hereafter, referred to as "target space"), the camera 10 is installed in a relatively higher place within the target space. The camera 10 photographs the target space to generate image data and outputs the generated image data to the object detection unit 20.

The object detection unit 20 detects a tracking target from the image data generated by the camera 10 and outputs, to the detected area database 30, detection result information including a detected area indicating an area of the tracking target. The object detection unit 20 employs a process in which the background difference is used as a detection process. Specifically, the object detection unit 20 defines, as a reference image, an image in a state where no person of the tracking target exists, compares the reference image and the current image, and recognizes a set of images with the difference as the area for the person of the tracking target. Then, the object detection unit 20 creates, as the detected area, a rectangular frame including the recognized area of the person.

In the description of the present embodiment, the y coordinate of the upper line of the rectangular frame is referred to as an over coordinate, so are the y coordinate of the lower line as an under coordinate, the x coordinate of the right line as a right coordinate, and the x coordinate of the left line as a left coordinate. The object detection unit 20 defines the over coordinate $y_o$ by a coordinate derived by adding a predetermined margin to the maximum y coordinate, the under coordinate $y_u$ by a coordinate derived by subtracting a predetermined margin from the minimum y coordinate, the right coordinate $x_r$ by a coordinate derived by adding a predetermined margin to the rightmost x coordinate, and the left coordinate $x_l$ by a coordinate derived by subtracting a predetermined margin from the leftmost x coordinate.

Figure 2:
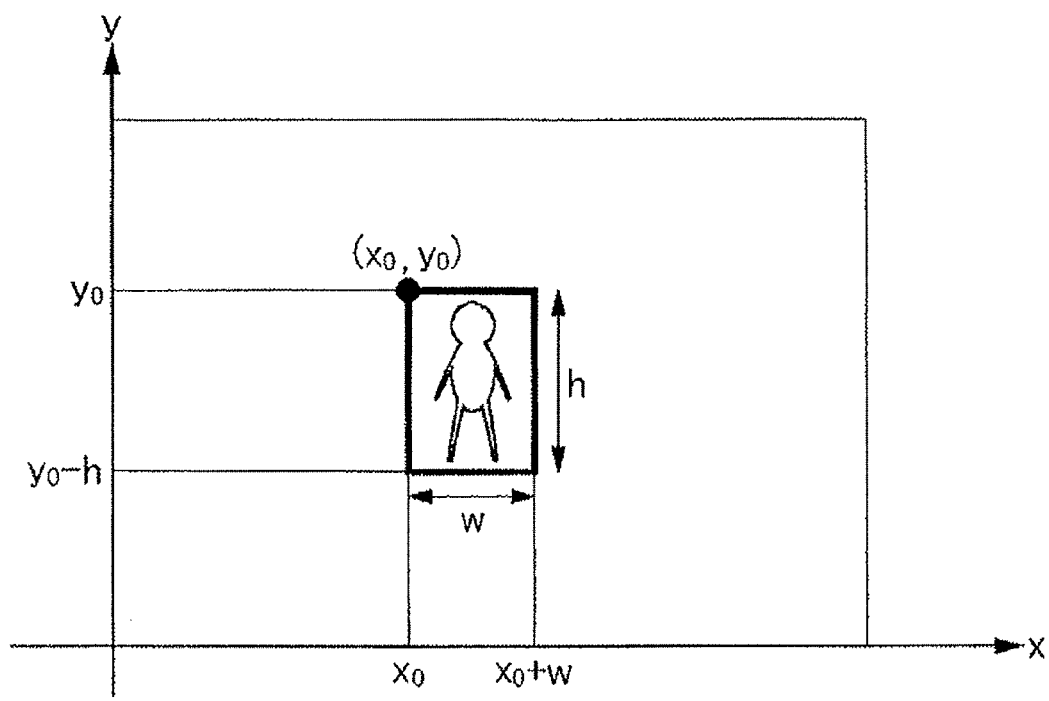
FIG. 2 is a diagram showing a rectangular frame in the embodiment of the present invention.

FIG. 2 is a diagram showing the rectangular frame in the present embodiment. Where the detected position (the left-over coordinate) is $(x_0, y_0)$, the frame width is w, and the frame height is h, the over coordinate $y_o$ will be $y_0$ (the y coordinate of the detected position), the under coordinate $y_u$ will be $y_0 - h$ (the y coordinate of the detected position minus the frame height), the right coordinate $x_r$ will be $x_0 + w$ (the x coordinate of the detected position plus the frame width), and the left coordinate $x_l$ will be $x_0$ (the x coordinate of the detected position), as shown in FIG. 2.

Upon recognizing the area of the person, the object detection unit 20 outputs, to the detected area database 30, the current time, a tracking ID, a set left-over coordinate of the frame, a frame width and a frame height as the detection result information. The detected area database 30 stores the detection result information outputted from the object detection unit 20.

FIG. 3 is a diagram showing an example of the detection result information stored in the detected area database 30. As shown in FIG. 3, the information of the detection time, a detection ID, a detected position, a frame width and a frame height is stored in the detected area database 30 as the detection result information. The detection time is the time when the tracking target is detected. The detection ID is the tracking ID provided uniquely to the tracking target. The tracking targets that are determined to be the same each other are provided with the identical detection ID. The detected position is the left-over coordinate of the rectangular frame surrounding the tracking target. The frame width and the frame height are the frame width and height of the rectangle surrounding the tracking target.

The environment database 40 stores the information representing the photographing environment of the camera 10 (hereafter, referred to as "environment information"). The photographing environment may include information of the floor reflection area and information of the covered area. The floor reflection area and the covered area are areas within the image space generated by the camera 10. The floor reflection area is an area where the tracking target is likely to be reflected on the floor. The covered area is an area where the tracking target is covered from the camera 10. Such environment information is pre-stored in the environment database 40 based on the installation state (position, angle, angle of view, and so on).

Figure 4:
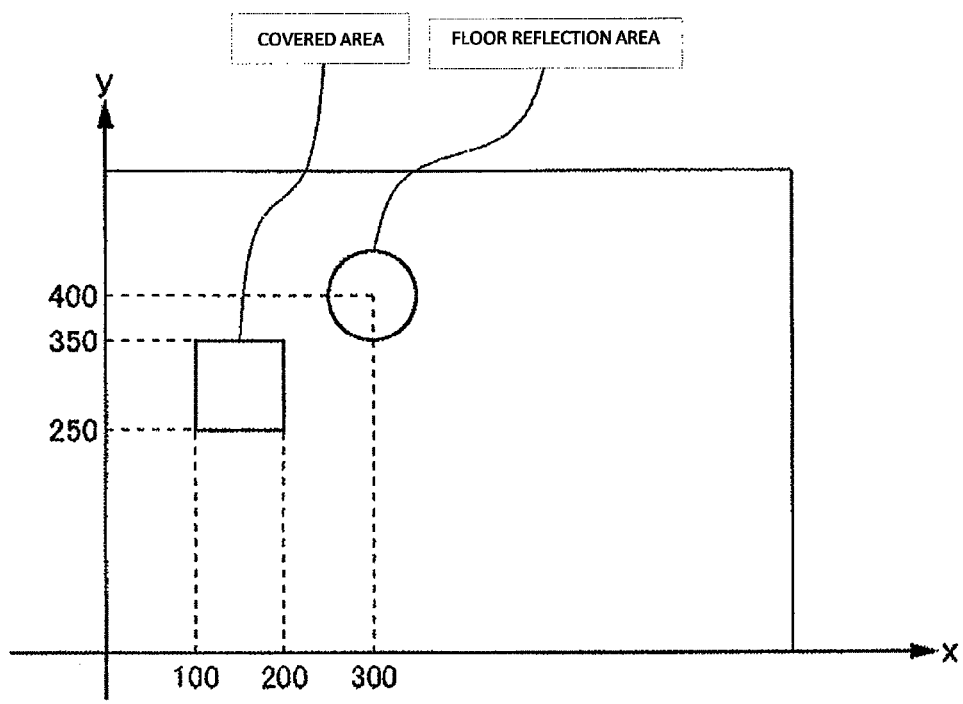
FIG. 4 is a diagram showing an example of environment information in the embodiment of the present invention.

FIG. 4 is a diagram showing an example of the environment information, and FIG. 5 is a diagram showing an example of the environment information stored in the environment database 40. In the example of FIG. 4, a circular area having a center, represented by x=300, y=400, is set as the floor reflection area, and a rectangular area, represented by x=100 to 200, y=250 to 350, is set as the covered area. In the environment database 40, as shown in FIG. 5, the information of a class of the environment information and an area on the image is stored.

The state determination unit 50 determines the state of the tracking target based on the current detection result information, the past detection result information, and the environment information stored in the environment database 40, and generates state class information. Then, the state class information along with the current time and the tracking ID is outputted to the reference point creation unit 60.

The state class information is information indicating the state of the current tracking target. The state class includes six states: "normal", "crouching", "spreading arm", "floor reflection", "covered", and "noise". The "spreading arm" state further includes a "spreading right arm" state and a "spreading left arm" state.

The state class information is used to create the reference point at the reference point creation unit 60. The state determination unit 50 determines whether or not, in particular, "normal" state has transitioned to any one of the states of "crouching", "spreading arm", "floor reflection", "covered", and "noise", and whether or not any one of the states of "crouching", "spreading arm", "floor reflection", "covered", and "noise" has turned back to the "normal" state. The process for the state determination at the state determination unit 50 will be described later.

The reference point creation unit 60 reads out the necessary current and past detection result information from a search information database 30 based on the state class information inputted from the state determination unit 50, creates the reference point, and outputs its coordinate to the traffic line creation unit 70. The process of the reference point creation at the reference point creation unit 60 will be described later.

The traffic line creation unit 70 connects the reference points created by the reference point creation unit 60 in the time order to create a traffic line. In connecting the reference points, these points may be connected with a smooth curve instead of straight lines.

Described below will be the process of the state determination at the state determination unit 50 and the process of the reference point creation at the reference point creation unit 60. In the following descriptions, the under coordinate at the time t is denoted as $y_{ut}$, so are the over coordinate as $y_{ot}$, the right coordinate as $x_{rt}$, and the left coordinate as $x_{lt}$. The state determination unit 50 and the reference point creation unit 60 determine the state by using these under coordinate $y_{ut}$, over coordinate $y_{ot}$, right coordinate $x_{rt}$ and left coordinate $x_{lt}$, and derive the reference point. The over coordinate $y_{ot}$ and the left coordinate $x_{lt}$, are used as they stand since the over coordinate $y_{ot}$ and the left coordinate $x_{lt}$ for each time are stored in the detected area database 30 as described above.

For the under coordinate $y_{ut}$ and the right coordinate $x_{rt}$, since the information of the frame width $w_t$ and frame height $h_t$ besides the over coordinate $y_{ot}$ and the left coordinate $x_{lt}$ for each time are stored in the detected area database 30, the state determination unit 50 and the reference point creation unit 60 use that information to derive the under coordinate $y_{ut}$ and the right coordinate $x_{rt}$ by the following equations (1) and (2).

$$y_{ut} = y_{ot} - h_t \quad (1)$$

$$x_{rt} = x_{lt} - w_t \quad (2)$$

1. In the Case of "Normal" State

First, described will be the creation process of the reference point in the case of the "normal" state. In the case of the "normal" state, the center point of the rectangular frame will be the reference point. That is, when it is in the "normal" state at a certain time $t_1$, the x coordinate and the y coordinate of the reference point at the time $t_1$ are expressed by the following equations (3) and (4), respectively.

$$x = (x_{rt1} + x_{lt1})/2 \quad (3)$$

$$y = (y_{ot1} + y_{ut1})/2 \quad (4)$$

The equations (1) and (2) as described above are substituted into the equations (3) and (4), resulting in the equations (3') and (4') below. The reference point creation unit 60 uses the information of the over coordinate $y_{ot1}$, the left coordinate $x_{lt1}$, the frame width $w_{t1}$, and the frame height $h_{t1}$ stored in the detected area database 30 to derive the reference point by the following equations (3') and (4').

$$x = x_{lt1} + w_{t1}/2 \quad (3')$$

$$y = y_{ot1} - h_{t1}/2 \quad (4')$$

2-1. In the Case of Transition From "Normal" State to "Crouching" State

Figure 6:
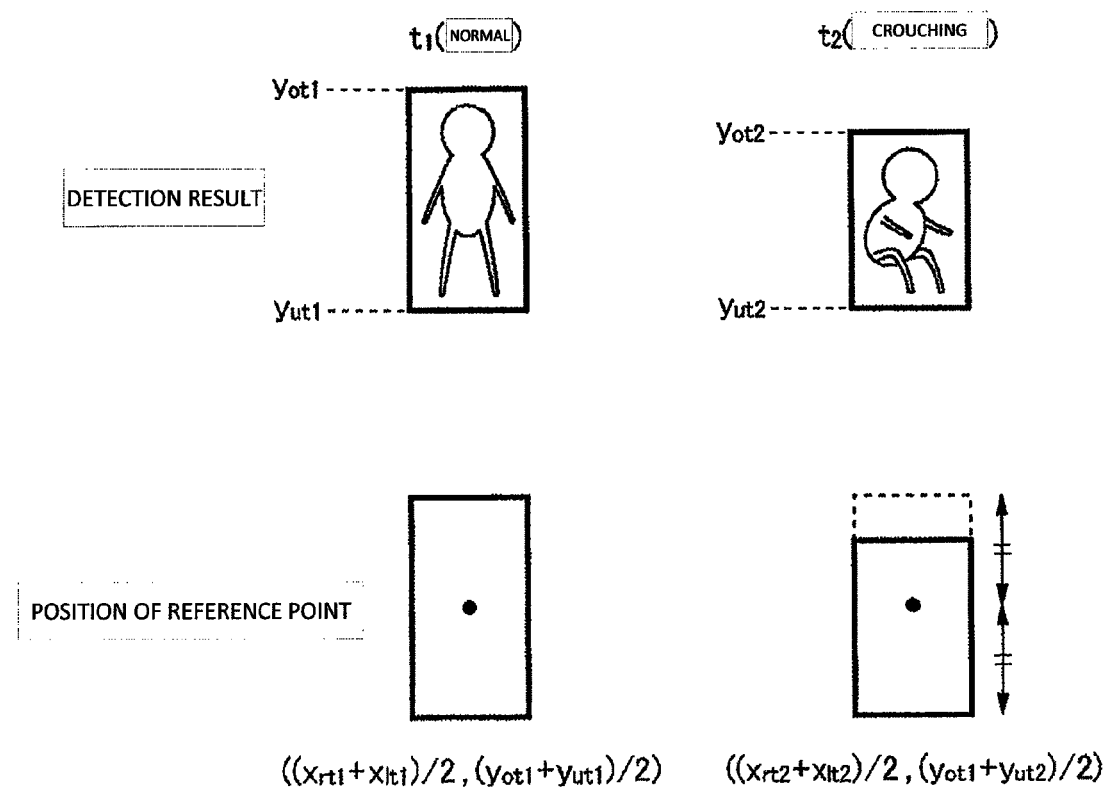
FIG. 6 is a diagram illustrating a determination condition of a transition from a "normal" state to a "crouching" state and a creation of a reference point under the "crouching" state in the embodiment of the present invention.

FIG. 6 is a diagram illustrating the determination condition for the transition from the "normal" state to the "crouching" state and the creation of the reference point for the "crouching" state. FIG. 6 shows that the tracking target in the "normal" state at the time $t_1$ has changed to the "crouching" state at the time $t_2$. Typically, when a person crouches, the position of its steps does not change, while the position of its head comes down. At this time, in the rectangular frame, the position of the upper line only comes down to a high degree while the position of the lower line does not substantially change.

By utilizing these features, the state determination unit 50 can determine that the person has crouched if the difference of the lower line is within a predetermined range and the upper line has come down by more than a predetermined amount. Specifically, when a tracking target with a certain tracking ID is in the "normal" state at the time $t_1$ and the tracking target with the same tracking ID satisfies the determination condition for the "crouching" state below, then it is determined that the tracking target with that tracking ID has transitioned to the "crouching" state at the time $t_2$.

The determination condition for the transition from the "normal" state to the "crouching" state is that the following condition 1 and condition 2 are both true.

$$|y_{ut1} - y_{ut2}| < \epsilon_1 \quad \text{Condition 1:}$$

$$y_{ot1} - y_{ot2} > a \quad \text{Condition 2:}$$

The condition 1 is a condition that, $\epsilon_1$ being an error range, the difference of the under coordinate of the rectangular frame is within the error range. The condition 2 is a condition that the over coordinate of the rectangular frame is smaller than a threshold a. It may be possible to determine that the tracking target has entered the "crouching" state when this condition continues to be satisfied over a predetermined period of time.

Upon determining the "crouching" state by using the determination condition for the "crouching" state, the state determination unit 50 outputs, to the reference point creation unit 60, the state class information indicating the "crouching" state along with the time when the "crouching" state has occurred (the time $t_2$) and the tracking ID.

Upon obtaining the state class information indicating the "crouching" state, the reference point creation unit 60 reads out from the detected area database 30 the state detection information at the time when the "crouching" state has occurred (time $t_2$) and the state detection information at the end time of the "normal" state (time $t_1$), and derives the x coordinate and the y coordinate of the reference point in the "crouching" state at the time 6 by the following equations (5) and (6).

$$x = (x_{rt2} + x_{lt2})/2 \quad (5)$$

$$y = (y_{ot1} + y_{ut2})/2 \quad (6)$$

Here, it is characteristic to use the over coordinate $y_{ot1}$ at the end time of the "normal" state (time $t_1$) to derive the y coordinate of the reference point at the time $t_2$ of the "crouching" state. That is, while the reference point is the center point of the rectangular frame in the "crouching" state similarly to in the "normal" state, it is the over coordinate at the end time of the "normal" state, rather than the over coordinate at the time when the "crouching" state has occurred, that is employed as the over coordinate of the rectangular frame.

2-2. In the Case of Transition From "Crouching" State to "Normal" State

When the tracking target is in the "crouching" state at the time $t_2$ and at least one of the following condition 3 and condition 4, in relation to the tracking target with the same ID, is satisfied at the time $t_3$, the state determination unit 50 determines that the state has turned back from the "crouching" state to the "normal" state at the time $t_3$.

$$|y_{ut2} - y_{ut3}| > b \quad \text{Condition 3:}$$

$$y_{ot1} - y_{ot3} < \epsilon_2 \quad \text{Condition 4:}$$

The condition 3 is a condition that, a threshold being b, the under coordinate of the rectangular frame has changed over the threshold. That is, because the under coordinate would not change if the person of the tracking target crouches, it is no longer appropriate to determine that the target is in the "crouching" state when the under coordinate of the rectangular frame has changed to a high degree. Therefore, in such a case, the "crouching" state is cancelled and the state class is turned back to the "normal" state.

The condition 4 is a condition that, an error range being $\epsilon_2$, the over coordinate of the rectangular frame is substantially the same as the over coordinate at the time $t_1$ of the "normal" state immediately before the "crouching" state occurs. This means that the person having crouched has stood up and, also in this case, the state class is turned from the "crouching" state back to the "normal" state. In the "normal" state, the reference point creation unit 60 defines that the center point of the rectangular frame is the reference point according to the equations (3') and (4') described above.

3-1. In the Case of Transition From "Normal" State to "Spreading Arm" State

Figure 7:
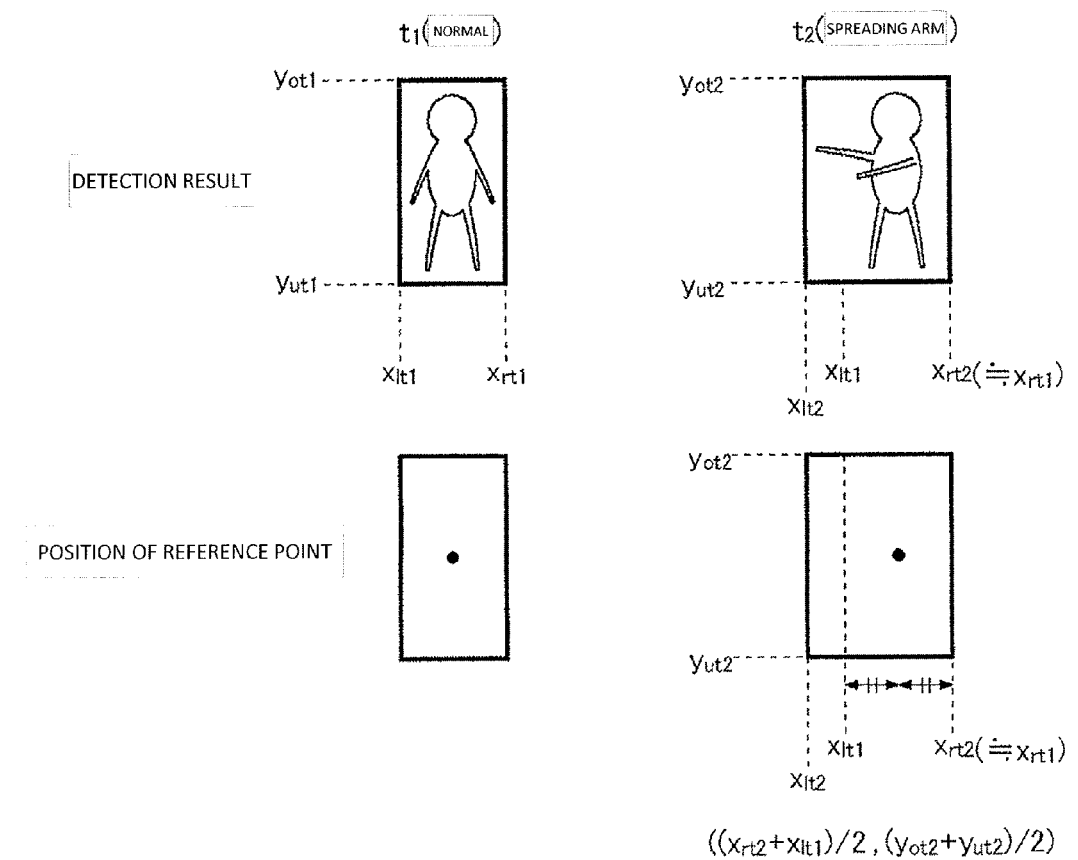
FIG. 7 is a diagram illustrating a determination condition of a transition from a "normal" state to a "spreading arm" state and a creation of a reference point under the "spreading arm" state in the embodiment of the present invention.

FIG. 7 is a diagram illustrating the determination condition of the transition from the "normal" state to the "spreading arm" state and the creation of the reference point of the "spreading arm" state. FIG. 7 shows that the tracking target which has been in the "normal" state turns to the "spreading arm" state at the time $t_2$. Typically, when a person spreads its arm, the positions of the head and the legs do not change while the arm spreads out to the left or right. At this time, while the positions of the upper line and the lower line of the rectangular frame do not substantially change, the frame width may increase.

Utilizing these features, the state determination unit 50 determines that the person being a tracking target has spread its arm if the difference of the upper line and the lower line is within a predetermined range and the frame width has increased over a predetermined threshold. Specifically, when a tracking target with a certain tracking ID is in the "normal" state at the time $t_1$ and the tracking target with the same tracking ID satisfies the determination condition of the "spreading arm" state below at the time $t_2$, it is determined that the tracking target with that tracking ID has transitioned to the "spreading arm" state at the time $t_2$.

The determination condition for the transition from the "normal" state to the "spreading arm" state is that all of the following conditions 5-7 are true.

$|y_{ut1}-y_{ut2}|<\epsilon_3$  Condition 5:

$|y_{ot1}-y_{ot2}|<\epsilon_4$  Condition 6:

$(x_{rt2}-x_{lt2})-(x_{rt1}-x_{lt1})>c$  Condition 7:

The condition 5 is a condition that, $\epsilon_3$ being an error range, the difference of the under coordinate of the rectangular frame is within the error range. The condition 6 is a condition that, $\epsilon_4$ being an error range, the difference of the over coordinate of the rectangular frame is within the error range. The condition 7 is a condition where the frame width of the rectangular frame increases over the threshold c. It may be possible to determine that the tracking target is in the "spreading art" state if this condition continues to be satisfied over a predetermined period of time.

The state determination unit 50 further compares $|x_{lt1}-x_{lt2}|$ with $|x_{rt1}-x_{rt2}|$ and, if $|x_{lt1}-x_{lt2}|$ is larger, determines that the tracking target is in the "spreading right arm" state in which the right arm is spread. If $|x_{rt1}-x_{rt2}|$ is larger, the state determination unit 50 determines that the tracking target is in the "spreading left arm" state in which the left arm is spread.

Upon determining that the tracking target is in the "spreading arm" state by using the above determination conditions for the "spreading arm" state, the state determination unit 50 further determines whether it is the "spreading right arm" state or the "spreading left arm" state according to the above determination conditions. Subsequently, the state determination unit 50 outputs, to the reference point creation unit 60, the state class information indicating the "spreading right arm" state or the state class information indicating the "spreading left arm" state along with the time when the "spreading arm" state has occurred (the time $t_2$) and the tracking ID.

Upon obtaining the state class information indicating the "spreading right arm" state, the reference point creation unit 60 reads out from the determination area database 30 the state determination information at the time when the "spreading right arm" state has occurred (the time $t_2$) and the state determination information at the end time of the "normal" state (the time $t_1$). The reference point creation unit 60 then derives the x coordinate and the y coordinate of the reference point in the "spreading right arm" state at the time $t_2$ by the following equations (7) and (8).

$x=(x_{rt2}+x_{lt1})/2$  (7)

$y=(y_{ot2}+y_{ut2})/2$  (8)

Here, it is characteristic to use the left coordinate $x_{lt1}$ at the end time of the "normal" state (the time $t_1$) to derive the x coordinate of the reference point at the time $t_2$ in the "spreading right arm" state. That is, while the reference point is the center point of the rectangular frame in the "spreading right arm" state similarly to the "normal" state, it is the left coordinate at the end time of the "normal" state, rather than the left coordinate of the time when the "spreading right arm" state has occurred, that is employed as the left coordinate of the rectangular frame.

Upon obtaining the state class information indicating the "spreading left arm" state, the reference point creation unit 60 reads out from the determination area database 30 the state determination information at the time when the "spreading left arm" state has occurred (the time $t_2$) and the state determination information at the end time of the "normal" state (the time $t_1$). Subsequently, the reference point creation unit 60 derives the x coordinate and the y coordinate of the reference point under the "spreading left arm" state at the time $t_2$ by the following equations (9) and (10).

$x=(x_{rt1}+x_{lt2})/2$  (9)

$y=(y_{ot2}+y_{ut2})/2$  (10)

Here, it is characteristic to use the right coordinate $x_{rt1}$ at the end time of the "normal" state (the time $t_1$) to derive the x coordinate of the reference point at the time $t_2$ in the "spreading left arm" state. That is, while the reference point is the center point of the rectangular frame in the "spreading left arm" state similarly to the "normal" state, it is the right coordinate at the end time of the "normal" state, rather than the right coordinate of the time when the "spreading left arm" state has occurred, that is employed as the right coordinate of the rectangular frame.

3-2. In the Case of Transition From "Spreading Arm" State to "Normal" State

When a tracking target with a certain tracking ID is in the "spreading arm" state at the time $t_2$ and, for the tracking target with the same tracking ID, if a condition 8 below or both of conditions 9 and 10 below are satisfied, the state determination unit 50 determines that the "spreading arm" state has turned back to the "normal" state at the time $t_3$.

$|(y_{ot2}-y_{ut2})-(y_{ot3}-y_{ut3})|>d$  Condition 8:

$|(y_{ot2}-y_{ut2})-(y_{ot3}-y_{ut3})|<\epsilon_5$  Condition 9:

$|(x_{rt3}-x_{lt3})-(x_{rt1}-x_{lt1})|<\epsilon_6$  Condition 10:

The condition 8 is a condition that, a threshold being d, the frame height of the rectangular frame has changed over the threshold. That is, that the frame height has changed to a high degree means that it is likely that the person being a tracking target has moved closer to the camera 10, and it is thus inappropriate to determine that the increase in the frame width in this case corresponds to the "spreading arm" state. Therefore, in such case, the "spreading arm" state is cancelled and the state class is turned back to the "normal" state.

The condition 9 is a condition that, an error range being $\epsilon_5$, the frame height has not substantially changed. The condition 10 is a condition that, an error range being $\epsilon_6$, the frame width has not substantially changed. If both of the condition 9 and condition 10 are satisfied, it means that the person having spread its arm stopped spreading the arm. Therefore, also in this case, the state class is turned back to the "normal" state.

4-1. In the Case of Transition From "Normal" State to "Floor Reflection" State

Figure 8:
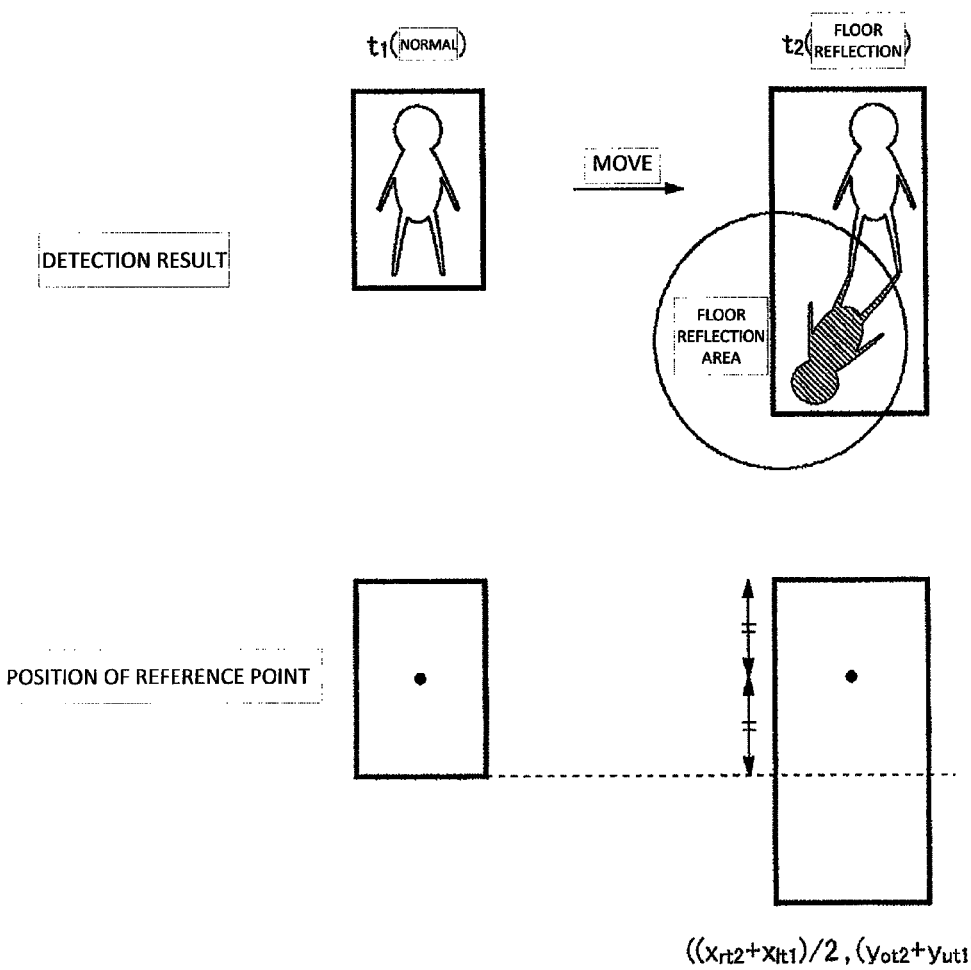
FIG. 8 is a diagram illustrating a determination condition of a transition from a "normal" state to a "floor reflection" state and a creation of a reference point under the "floor reflection" state in the embodiment of the present invention.

FIG. 8 is a diagram illustrating the determination condition of the transition from the "normal" state to the "floor reflection" state and the creation of the reference point of the "floor reflection" state. FIG. 8 shows that the tracking target which has been in the "normal" state at the time $t_1$ turns to be in the "floor reflection" state at the time $t_2$. As described above, the object detection unit 20 detects the tracking target by using the difference between the past image and the current image. Accordingly, when the person is in a reflective area, the part of the floor reflecting the person can make the difference area, which causes the rectangular frame to be set larger than the actual person.

Therefore, when at least one of the ends of the lower line is in the floor reflection area, the state determination unit 50 determines that it is in the "floor reflection" state. In order to determine the "floor reflection" state, the state determination unit 50 refers to the environment information stored in the environment database 40. Specifically, assuming that the environment information consistent with that shown in FIG. 5 is stored in the environment database 40, it is determined that the tracking target is in the "floor reflection" state at the time $t_2$ if the tracking target satisfies the determination condition for the "floor reflection" state below at the time $t_2$.

The determination condition for the "floor reflection" state is that at least one of the following condition 11 and condition 12 is true.

$$(x_{rt2}-300)^2+(y_{ut2}-400)^2<1600 \qquad \text{Condition 11:}$$

$$(x_{lt2}-300)^2+(y_{ut2}-400)^2<1600 \qquad \text{Condition 12:}$$

The condition 11 is a condition that the right end of the lower line is within the floor reflection area. The condition 12 is a condition that the left end of the lower line is within the floor reflection area. It may be possible to determine the tracking target is in the "floor reflection" state if these conditions continue to be satisfied over a predetermined period of time.

Upon determining that the tracking target is in the "floor reflection" state by using the above determination condition for the "floor reflection" state, the state determination unit 50 outputs, to the reference point creation unit 60, the state class information indicating the "floor reflection" state along with the time when the "floor reflection" state has occurred (the time $t_2$) and the tracking ID.

Upon obtaining the state class information indicating the "floor reflection" state, the reference point creation unit 60 reads out from the determination area database 30 the state determination information at the time when the "floor reflection" state has occurred (the time $t_2$) and the state determination information at the end time of the "normal" state (the time $t_1$). Subsequently, the reference point creation unit 60 derives the x coordinate and the y coordinate of the reference point in the "floor reflection" state at the time $t_2$ by the following equations (11) and (12).

$$x=(x_{rt1}+x_{lt2})/2 \qquad (11)$$

$$y=(y_{ot2}+y_{ut1})/2 \qquad (12)$$

Here, it is characteristic to use the under coordinate $y_{ut1}$ at the end time of the "normal" state (the time $t_1$) to derive the y coordinate of the reference point at the time $t_2$ in the "floor reflection" state. That is, while the reference point is the center point of the rectangular frame in the "floor reflection" state similarly to the "normal" state, it is the under coordinate at the end time of the "normal" state, rather than the under coordinate of the time when the "floor reflection" state has occurred, that is employed as the under coordinate of the rectangular frame.

4-2. In the Case of Transition From "Floor Reflection" State to "Normal" State

When a tracking target with a certain tracking ID is in the "floor reflection" state at the time $t_2$ and, for the tracking target with the same tracking ID, the state determination unit 50 determines that the "floor reflection" state has turned back to the "normal" state at the time $t_3$ when the ends of the lower line satisfies neither the condition 11 nor condition 12 above.

5-1. In the Case of Transition From "Normal" State to "Covered" State

Figure 9:
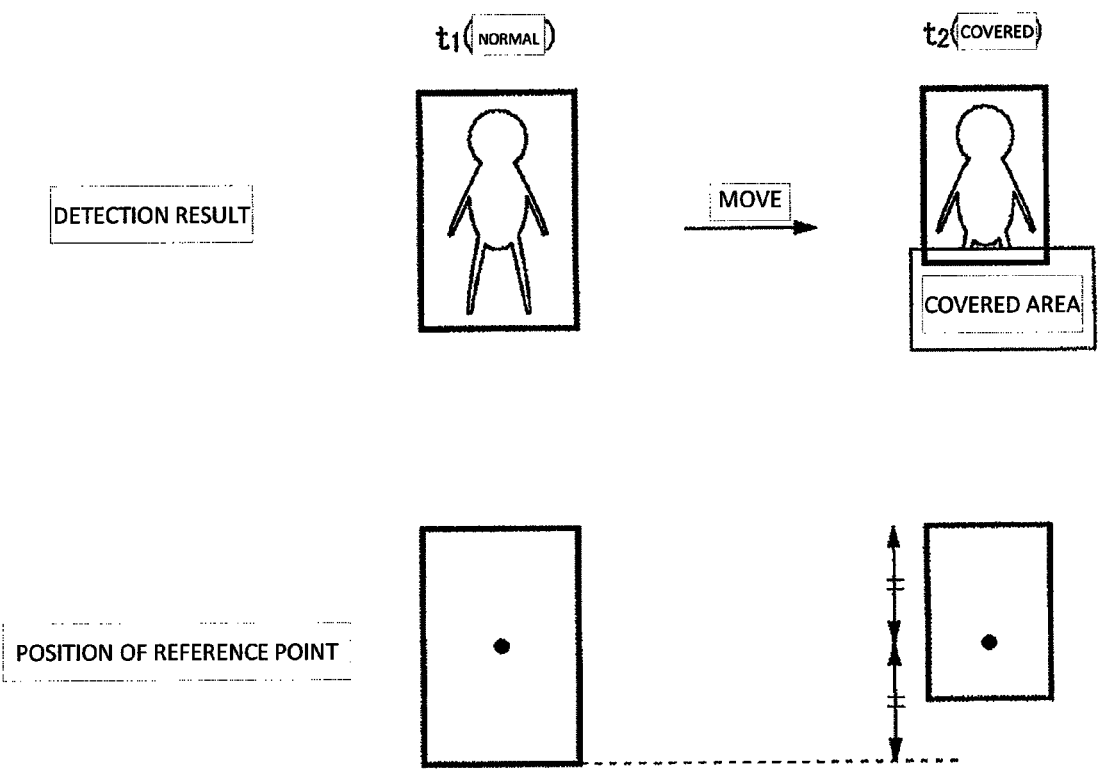
FIG. 9 is a diagram illustrating a determination condition of a transition from a "normal" state to a "covered" state and a creation of a reference point under the "covered" state in the embodiment of the present invention.

FIG. 9 is a diagram illustrating the determination condition of the transition from the "normal" state to the "covered" state and the creation of the reference point of the "covered" state. FIG. 9 shows that the tracking target which has been in the "normal" state at the time $t_1$ turns to be the "covered" state at the time $t_2$. Typically, when a person is behind a covering object, the detection of the tracking target by using the difference between the past image and the current image causes the rectangular frame to be set smaller than the actual person.

Therefore, when the lower line of the rectangular frame is completely included in the covered area, the state determination unit 50 determines the tracking target to be in the "covered" state. In order to determine the "covered" state, the state determination unit 50 refers to the environment information stored in the environment database 40. Specifically, assuming that the environment information consistent with that shown in FIG. 5 is stored in the environment database 40, it is determined that the tracking target is in the "covered" state at the time $t_2$ when the tracking target satisfies the determination condition for the "covered" state below at the time $t_2$.

The determination condition for the "covered" state is that all of the following condition 13, condition 14, and condition 15 are true.

$$100<x_{lt2}<200 \qquad \text{Condition 13:}$$

$$100<x_{rt2}<200 \qquad \text{Condition 14:}$$

$$250<y_{ut2}<350 \qquad \text{Condition 15:}$$

The condition 13 and the condition 15 are conditions that the left end of the lower line is within the covered area. The condition 14 and the condition 15 are conditions that the right end of the lower line is within the covered area. Therefore, if all of the condition 13, the condition 14, and the condition 15 are true, this means that the lower line is completely included in the covered area. As described above, the lower line of the rectangular frame is set ensuring a predetermined margin m from the lowermost y coordinate of the coordinates of the pixels having the difference from the reference image, and this lower line is thus included in the covered area when the lower part of the person is behind the covering object as shown in FIG. 9. Therefore, the "covered" state can be determined by the above conditions. It may be possible to determine that the tracking target is in the "covered" state if the above conditions continue to be satisfied over a predetermined period of time.

Upon determining that the tracking target is in the "covered" state by using the above determination conditions for the "covered" state, the state determination unit 50 outputs, to the reference point creation unit 60, the state class information indicating the "covered" state along with the time when the "covered" state has occurred (the time $t_2$) and the tracking ID.

Upon obtaining the state class information indicating the "covered" state, the reference point creation unit 60 reads out from the determination area database 30 the state determination information at the time when the "covered" state has occurred (the time $t_2$) and the state determination information at the end time of the "normal" state (the time $t_1$). Subsequently, the reference point creation unit 60 derives the x coordinate and the y coordinate of the reference point in the "covered" state at the time $t_2$ by the following equations (13) and (14).

$$x=(x_{rt2}+x_{lt2})/2 \qquad (13)$$

$$y=(y_{ot2}+y_{ut1})/2 \qquad (14)$$

Here, it is characteristic to use the under coordinate $y_{ut1}$ at the end time of the "normal" state (the time $t_1$) to derive the y coordinate of the reference point at the time $t_2$ in the "covered" state. That is, while the reference point is the center point of the rectangular frame in the "covered" state similarly to the "normal" state, it is the under coordinate at the end time of the "normal" state, rather than the under coordinate of the time when the "covered" state has occurred, that is employed as the under coordinate of the rectangular frame.

The covered state may also occur when the person being the tracking target is behind a wall and, in this case, the center point of the rectangular frame is not in the center in the lateral direction. In such the covered state in the lateral direction, however, no special handling is applied. Because, when a person is moving in the right direction to be gradually behind a wall, the center point also gradually approaches the wall when the trace of the center point is taken by setting the rectangular frame in the usual process. Thus, the center point reaches the wall at the moment when the person is completely behind the wall and, therefore, such the trace of the center point is correct as the traffic line of the person. Therefore, for the covering object much higher than the height of the person, it is not necessary to store it as a covering area in the environment database 40.

Further, according to the determination process as described above, when the person is in front of the covering object, the lower line of the rectangular frame is not included in the covered area although the rectangular frame overlaps the covered area. Therefore, when the person is in front of the covering object, it cannot be incorrectly determined as the "covered" state.

5-2. In the Case of Transition From "Covered" State to "Normal" State

When a tracking target with a certain tracking ID is in the "covered" state at the time $t_2$) and, for the tracking target with the same tracking ID, if at least one of the conditions 13 to 15 above is not satisfied at the time $t_3$, the state determination unit 50 determines that the "covered" state has turned back to the "normal" state at the time $t_3$.

6. In the Case of "Noise" State

When none of the states of "crouching", "spreading arm", "floor reflection", or "covered" is resulted even by using the determination conditions as described above but the ratio of the frame width to the frame height of the rectangular frame and/or the size of the frame changes to a high degree in a short time period, it can be determined to be caused by some noise.

Then, if the state does not fall under any of the "crouching", "spreading arm", "floor reflection", or "covered" and a change amount of either frame width or frame height of the rectangular frame exceeds a predetermined threshold, the state determination unit 50 determines it to be in the "noise" state. Upon determining that it is the noise, the state determination unit 50 outputs, to the reference point creation unit 60, the state class information indicating the "noise" state along with the time when the "noise" state has occurred and the tracking ID.

Since the noise may occur over a plurality of image frames, the reference point creation unit 60 is successively inputted with the state class information indicating the "noise" state from the state determination unit 50. After receiving the state class information indicating the "noise" state before receiving the state class information indicating the state other than the "noise" state, that is, after waiting until the "noise" state ends, the reference point creation unit 60 reads out from the detected area database 30 the detection result information at the time of the "noise" state and the detection result information at the end time of the "normal" state.

Figure 10:
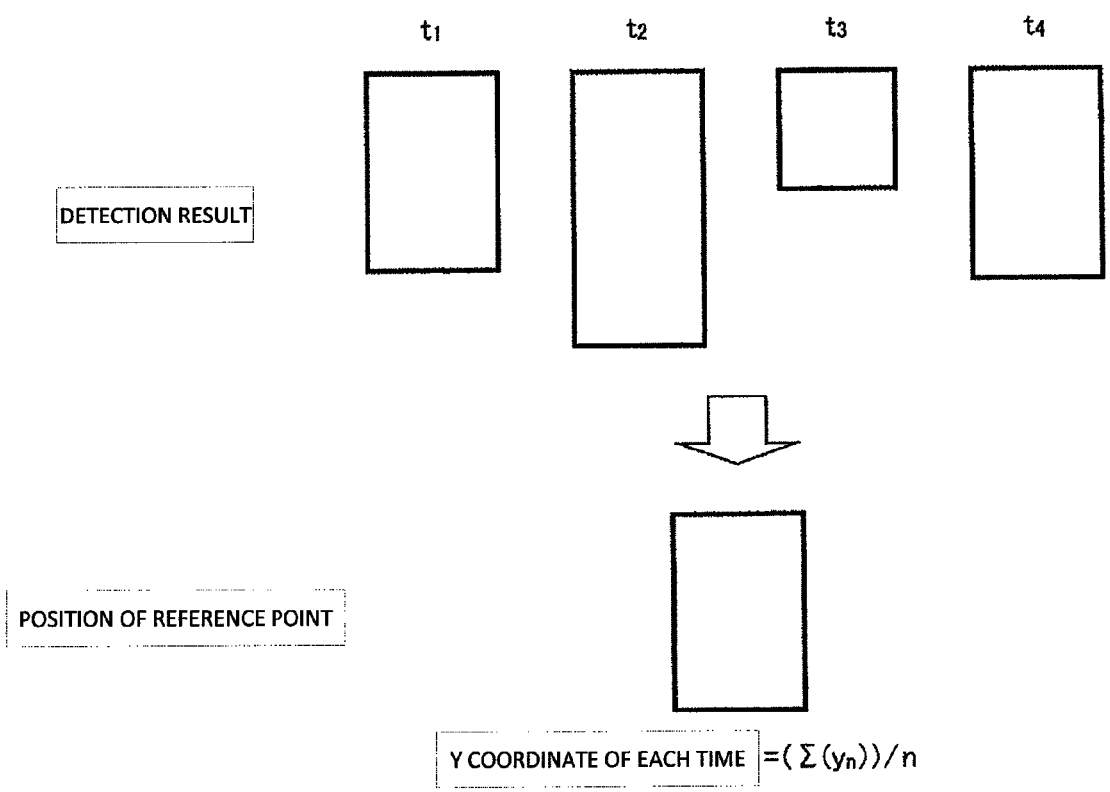
FIG. 10 is a diagram illustrating a creation of a reference point under a "noise" state in the embodiment of the present invention.
Figure 11:
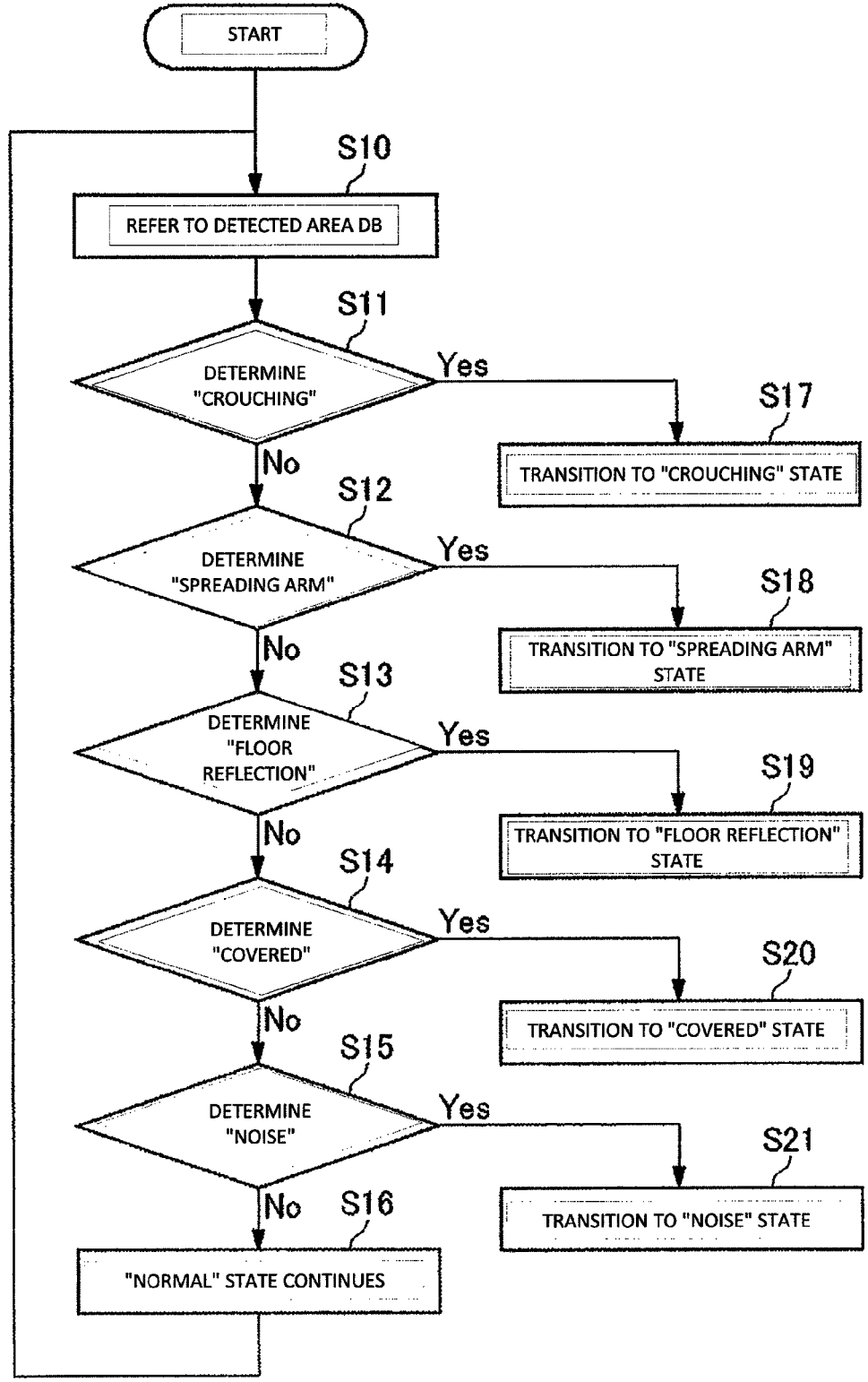
FIG. 11 is a flow diagram illustrating the operation of a state determination unit in the embodiment of the present invention.

FIG. 10 is a diagram illustrating the creation of the reference point of the "noise" state. In the example of FIG. 11, while it is determined that the tracking target is in the "normal" state at the time $t_1$, the position of the lower line moves extremely downward at the time $t_2$ even though it is not in the floor reflection area, the position of the lower line moves extremely upward at the time $t_3$ even though it is not in the covered area, and the position of the lower line again moves downward at the time $t_4$. There is no large change in the rectangular frame after the time $t_4$ and it is thus determined to turn back to the "normal" state at the time $t_5$.

In such case, the reference point creation unit 60 reads out from the detected area database 30 the detection result information at the time of the "noise" state (the time $t_2$-$t_4$) and the detection result information at the end time of the "normal" state (the time $t_1$). Then, the rectangular frames for the read detection result information are averaged for the time of the "noise" state (the time $t_2$-$t_4$) and the end time of the "normal" state (the time $t_1$).

Specifically, assuming that the number of frames in the period for the "noise" state is n, the reference point creation unit 60 derives the x coordinate and the y coordinate of the reference point of this period by the following equations (15) and (16).

$$x(\Sigma(x_{rt}+x_{lt})/2)/n \tag{15}$$

$$y(\Sigma(y_{ot}+y_{ut})/2)/n \tag{16}$$

For the traffic line creation device 1 configured as described above, the operation of the state determination unit 50 will be described. FIG. 11 is a flow diagram illustrating the operation of the state determination unit 50. In response to the operation started by the traffic line creation device 1, first, the camera 10 starts photographing to sequentially output the image frames to the object detection unit 20, and the object detection unit 20 detects the object of the tracking target from the inputted image frames to store the detection result information in the detected area database 30. The state determination unit 50 performs the state determination for the detection result information stored in the detected area database 30 while starting the determination assuming that the initial state is the "normal" state.

The state determination unit 50 refers to the detected area database 30 (step S10) and determines whether or not the state has transitioned to the "crouching" state (step S11). If it is determined that the state has not transitioned to the "crouching" state ("NO" in step S11), it is then determined whether or not the state has transitioned to the "spreading arm" state (step S12). If it is determined that the state has not transitioned to the "spreading arm" state ("NO" in step S12), it is then determined whether or not the state has transitioned to the "floor reflection" state (step S13). If it is determined that the state has not transitioned to the "floor reflection" state ("NO" in step S13), it is then determined whether or not the state has transitioned to the "covered" state (step S14). If it is determined that the state has not transitioned to the "covered" state ("NO" in step S14), it is then determined whether or not the state has transitioned to the "noise" state (step S15). If it is determined that the state has not transitioned to the "noise" state ("NO" in step S15), the state class information indicating the "normal" state is outputted to the reference point creation unit 60 (step S16).

In the "crouching" state determination (step S11) described above, if the state is determined to be the "crouching" ("YES" in step S11), the process of the "crouching" state (step S17) is entered. In the "spreading arm" state determination (step S12), if the state is determined to be the "spreading arm" ("YES" in step S12), the process of the "spreading arm" state (step S18) is entered. In the "floor reflection" state determination (step S13), if the state is determined to be the "floor reflection" ("YES" in step S13), the process of the "floor reflection" state (step S19) is entered. In the "covered" state determination (step S14), if the state is determined to be the "covered" ("YES" in step S14), the process of the "covered" state (step S20) is entered. In the "noise" state determination (step S15), if the state is determined to be the "noise" ("YES" in step S15), the process of the "noise" state (step S21) is entered.

Figure 12:
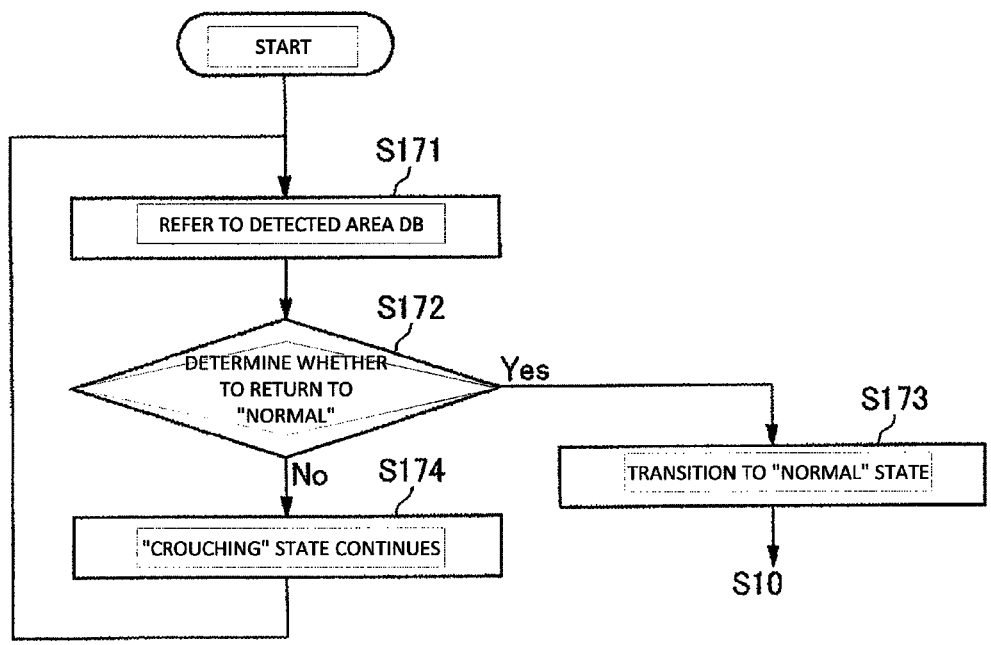
FIG. 12 is a flow diagram of a process for the "crouching" state in the embodiment of the present invention.

FIG. 12 is a flow diagram for the process of the "crouching" state by the state determination unit 50. The state determination unit 50 refers to the detected area database 30 (step S171) to obtain the latest detection result information and the past detection result information. The state determination unit 50 uses the latest detection result information and the past detection result information to determine whether or not to return to the "normal" state (step S172). If the condition for returning to the "normal" state is satisfied ("YES" in step S172), the transition to the "normal" state is made (step S173) and the flow returns to step S10. If the conditions for returning to the "normal" state are not satisfied ("NO" in step S172), the state class information indicating the "crouching" state is outputted to the reference point creation unit 60 (step S174), and the flow returns to step S171 after waiting until the next detection result of the image frame is stored in the detected area database 30.

Figure 13:
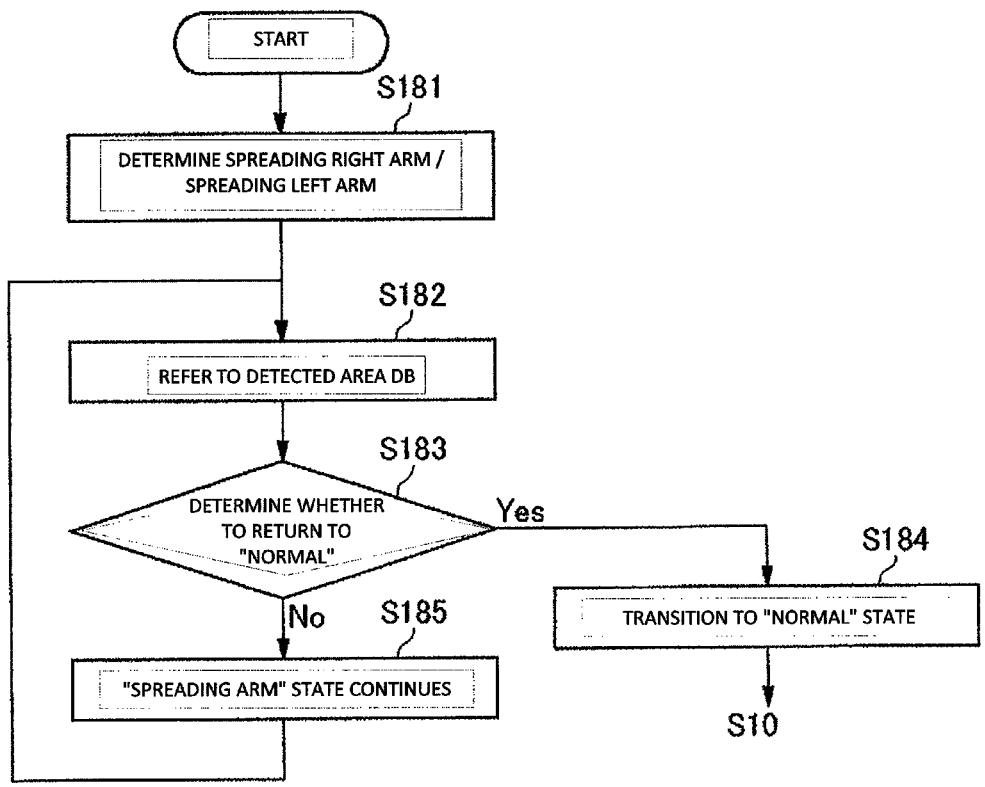
FIG. 13 is a flow diagram of a process for the "spreading arm" state in the embodiment of the present invention.

FIG. 13 is a flow diagram of the process for the "spreading arm" state by the state determination unit 50. Upon starting the process of the "spreading arm" state, the state determination unit 50 initially determines whether the state is the "spreading right arm" or the "spreading left arm" (step S181). Then, the detected area database 30 is referred (step S182) to obtain the latest detection result information and the past detection result information. The state determination unit 50 uses the latest detection result information and the past detection result information to determine whether or not to return to the "normal" state (step S183). If the condition for returning to the "normal" state is satisfied ("YES" in step S183), the transition to the "normal" state is made (step S184) and the flow returns to step S10. If the condition for returning to the "normal" state is not satisfied ("NO" in step S183), the state class information indicating the "spreading arm" state is outputted to the reference point creation unit 60 (step S185), and the flow returns to step S182 after waiting until the next detection result of the image frame is stored in the detected area database 30.

Figure 14:
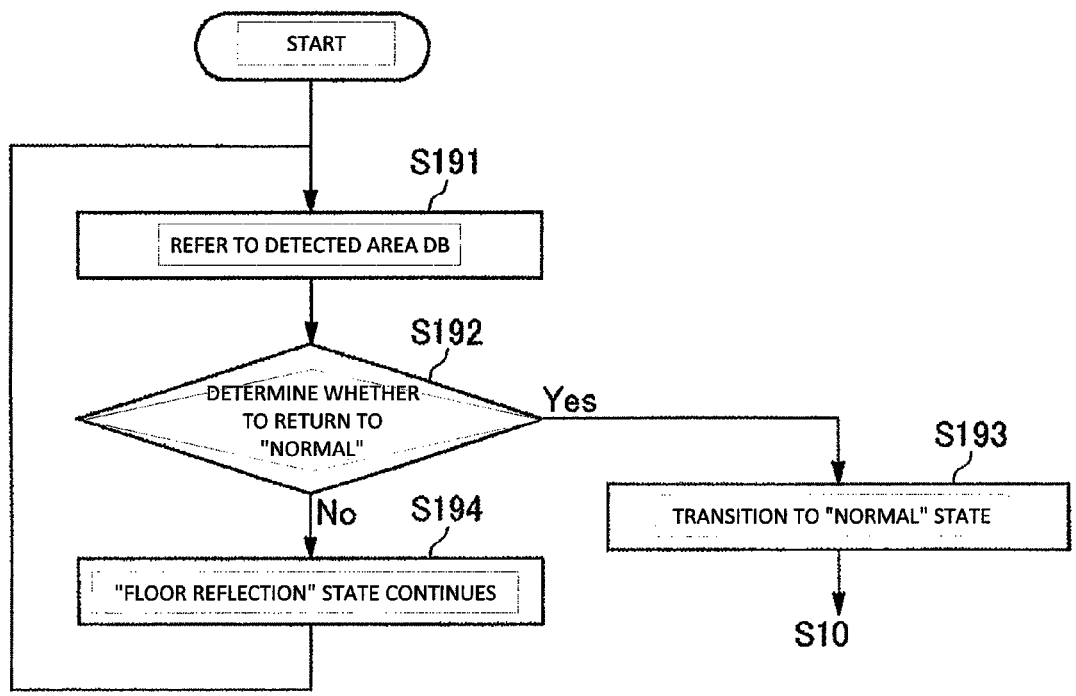
FIG. 14 is a flow diagram of a process for the "floor reflection" state in the embodiment of the present invention.

FIG. 14 is a flow diagram of the process for the "floor reflection" state by the state determination unit 50. Upon starting the process of the "floor reflection" state, the state determination unit 50 initially refers to the detected area database 30 (step S191) to obtain the latest detection result information and the past detection result information. The state determination unit 50 uses the latest detection result information and the past detection result information to determine whether or not to return to the "normal" state (step S192). If the condition for returning to the "normal" state is satisfied ("YES" in step S192), the transition to the "normal" state is made (step S193) and the flow returns to step S10. If the condition for returning to the "normal" state is not satisfied ("NO" in step S192), the state class information indicating the "floor reflection" state is outputted to the reference point creation unit 60 (step S194), and the flow returns to step S191 after waiting until the next detection result of the image frame is stored in the detected area database 30.

Figure 15:
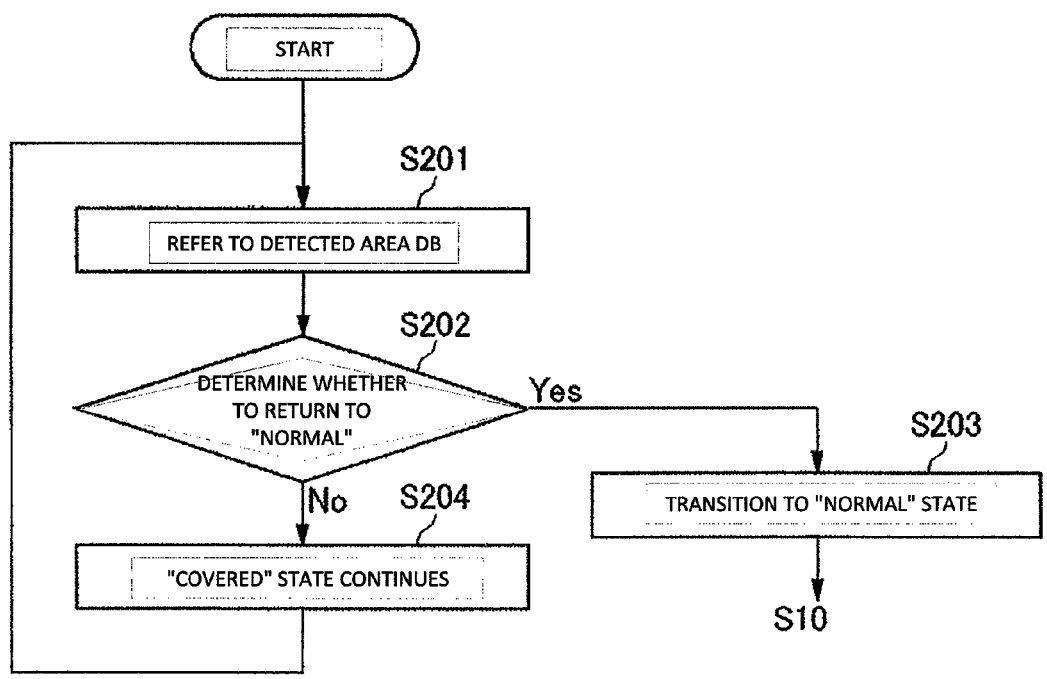
FIG. 15 is a flow diagram of a process for the "covered" state in the embodiment of the present invention.

FIG. 15 is a flow diagram of the process for the "covered" state by the state determination unit 50. The state determination unit 50 refers to the detected area database 30 (step S201) to obtain the latest detection result information and the past detection result information. The state determination unit 50 uses the latest detection result information and the past detection result information to determine whether or not to return to the "normal" state (step S202). If the condition for returning to the "normal" state is satisfied ("YES" in step S202), it transitions to the "normal" state (step S203) and returns to step S10. If the condition for returning to the "normal" state is not satisfied ("NO" in step S202), the state class information indicating the "covered" state is outputted to the reference point creation unit 60 (step S204), and the flow returns to step S201 waits until the next detection result of the image frame is stored in the detected area database 30.

Figure 16:
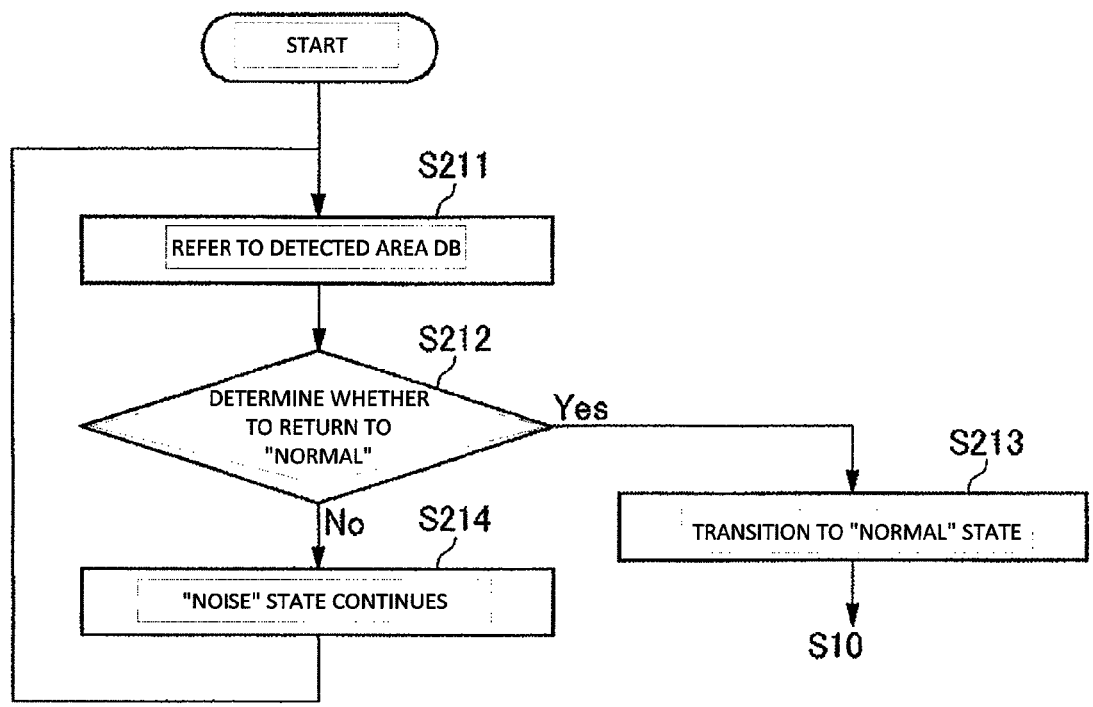
FIG. 16 is a flow diagram of a process for the "noise" state in the embodiment of the present invention.

FIG. 16 is a flow diagram of the process for the "noise" state by the state determination unit 50. The state determination unit 50 refers to the detected area database 30 (step S211) to obtain the latest detection result information and the past detection result information. The state determination unit 50 uses the latest detection result information and the past detection result information to determine whether or not to return to the "normal" state (step S212). If the condition for returning to the "normal" state is satisfied ("YES" in step S212), the transition to the "normal" state is made (step S213) and the flow returns to step S10. If the condition for returning to the "normal" state is not satisfied (step S212, NO), the state class information indicating the "noise" state is outputted to the reference point creation unit 60 (step S214), and the flow returns to step S201 after waiting until the next detection result of the image frame is stored in the detected area database 30.

The state determination unit 50 outputs the state class information indicating the "noise" state to the reference point creation unit 60 every time when one piece of detection result information is determined as the "noise" state. As described above, upon receiving the state class information indicating the "noise" state, the reference point creation unit 60 uses (averages) plural pieces of detection result information having successive "noise" state to create the reference point without creating the reference point immediately. However, the present invention is not limited thereto. Instead, it may be configured that the state determination unit 50 does not output the state class information to the reference point creation unit 60 at the time of determining that the "normal" state has transitioned to the "noise" state and, after returning to the "normal" state, outputs, to the reference point creation unit 60, the state class information indicating the "noise" information along with the information of the time therebetween.

As described above, according to the traffic line creation device 1 according to the embodiment of the present invention, the state determination unit 50 determines the state of the tracking target and the reference point creation unit 60 creates the reference point according to the state determined by the state determination unit 50, which allows for reducing the incorrect creation of the traffic line such as the creation of the traffic line indicating that the tracking target has moved despite the fact that the tracking target has not moved.

In the embodiment as described above, although it has been described that either one of the states of "normal", "crouching", "spreading arm", "floor reflection", "covered", and "noise" is assigned for the tracking target, a plurality of the states except the "normal" state may be assigned. For example, the state determination unit 50 may be configured to be able to determine the state of both "crouching" and "floor reflection".

Further, in the embodiment described above, although it has been described that the center of the rectangular frame is utilized for the reference point creation method in the "normal" state, the reference point may be created by utilizing other part such as the center of the lower line of the rectangular frame, for example. In this case, the process for creating the reference point in each of the "crouching", "spreading arm", "floor reflection", "covered", and "noise" sates may be also changed according to the reference point in the "normal" state.

Further, in the embodiment described above, it has been described that it is the "normal" state only that is transitioned from the "crouching" state, the "spreading arm" state, the "floor reflection" state, the "covered" state, and the "noise" state. However, it may be other state than the "normal" state that is transitioned from the "crouching" state, the "spreading arm" state, the "floor reflection" state, the "covered" state, and the "noise" state. For example, the state determination unit 50 may be configured to be able to determine that the "crouching" state has transitioned to the "spreading arm" state.

Further, in the operation of the state determination unit 50 in the embodiment described above, the "crouching" determination, the "spreading arm" determination, the "floor reflection" determination, the "covered" determination, and "noise" determination are not necessarily performed in the order of the operation flows illustrated in FIG. 11, and thus any order is possible and a plurality of determinations may be performed in parallel at the same time.

Further, in the embodiment described above, although the traffic line creation device has been described that performs the determination for all the "crouching" determination, the "spreading arm" determination, the "floor reflection" determination, the "covered" determination, and "noise" determination, the traffic line creation device of the present invention may be the one that performs a part of the determinations among these determinations.

Although the preferred embodiment of the present invention that is currently conceivable has been described above, various modifications to the present embodiment may be possible, and it is intended that the attached claims include all such modifications within the spirit of truth and the scope of the present invention.

INDUSTRIAL APPLICABILITY

As described above, the traffic line creation device of the present invention has the advantage that the incorrect creation of the traffic line such as the creation of the traffic line which does not accurately reflect the movement of the tracking target can be reduced without increasing the processing load. Therefore, the device is applicable to the traffic line creation device and the like that detect the tracking target in the image to create the traffic line representing the motion trace of that tracking target.

REFERENCE SIGNS LIST

1 traffic line creation device
10 camera
20 object detection unit
30 detected area database
40 environment database
50 state determination unit
60 reference point creation unit
70 traffic line creation unit

The invention claimed is:

1. A traffic line creation device for creating a traffic line representing a motion trace of a tracking target, the device comprising:
   an object detector that detects the tracking target from a plurality of image frames to create a detected area of the tracking target in each of the plurality of image frames;
   a state determiner that determines a state of the tracking target based on the detected area in a current image frame and the detected area in an image frame at the time when the state of the tracking target was a normal state;
   a reference point creator that creates a single reference point of the tracking target for the detected area in each of the plurality of image frames, based on a process corresponding to the state determined by the state determiner; and
   a traffic line creator that creates a traffic line representing the motion trace of the tracking target by connecting the plurality of reference points created for the plurality of image frames.

2. The traffic line creation device according to claim 1, wherein the state determiner determines the state of the tracking target based on a temporal change in the detected area.

3. The traffic line creation device according to claim 1, wherein the state determiner determines the state of the tracking target based on a positional relationship between environment information set in a target space for traffic line creation and the detected area.

4. The traffic line creation device according to claim 1, wherein, when a particular state other than the normal state is determined by the state determiner, the reference point creator uses the detected area in the current image frame and the detected area in a previous image frame to create the reference point.

5. The traffic line creation device according to claim 1, wherein the object detector creates, as the detected area, a rectangular frame including the tracking target, the rectangular frame comprising an upper line, a lower line, a right line, and a left line.

6. The traffic line creation device according to claim 5, wherein
   the state determiner compares a current rectangular frame with a previous rectangular frame and, when a movement of the lower line is less than a first threshold and a downward movement of the upper line is greater than a second threshold, determines that a crouching state occurs, and
   when the crouching state is determined by the state determiner, the reference point creator employs the upper line of a rectangular frame at the time when the state of the tracking target was the normal state as the upper line of the rectangular frame to create the reference point.

7. The traffic line creation device according to claim 5, wherein
   the state determiner compares a current rectangular frame with a previous rectangular frame and, when movements of the upper line and the lower line are less than a third threshold and a rightward movement of the right line or a leftward movement of the left line is greater than a fourth threshold, determines that a spreading arm state occurs, and
   when the spreading arm state is determined by the state determiner, the reference point creator employs the right line or the left line of a rectangular frame at the time when the state of the tracking target was the normal state as the right line or the left line of the rectangular frame to create the reference point.

8. The traffic line creation device according to claim 5, wherein
   when at least one end of the lower line of a current rectangular frame is included in a floor reflection area set in a target space for traffic line creation, the state determiner determines that a floor reflection state occurs, and when the floor reflection state is determined by the state determiner, the reference point creator employs the lower line of a rectangular frame at the time when the state of the tracking target was the normal state as the lower line of the rectangular frame to create the reference point.

9. The traffic line creation device according to claim 5, wherein when the lower line of a current rectangular frame is included in a covered area set in a target space for traffic line creation, the state determiner determines that a covered state occurs, and when the covered state is determined by the state determiner, the reference point creator employs the lower line of a rectangular frame at the time when the state of the tracking target was the normal state as the lower line of the rectangular frame to create the reference point.

10. The traffic line creation device according to claim 5, wherein when a state does not correspond to a particular state other than the normal state but an aspect ratio or a size of the rectangular frame changes over a fifth threshold, the state determiner determines that a noise state occurs, and when the noise state is determined by the state determiner, the reference point creator averages a plurality of rectangular frames in a period determined to be the noise state to create the reference point.

11. A traffic line creation method for creating a traffic line representing a motion trace of a tracking target, the method comprising:

detecting the tracking target from a plurality of image frames to create a detected area of the tracking target in each of the plurality of image frames;

determining a state of the tracking target based on the detected area in a current image frame and the detected area in an image frame at the time when the state of the tracking target was a normal state;

creating a single reference point of the tracking target for the detected area in each of the plurality of image frames based on a process corresponding to the determined state; and creating a traffic line representing the motion trace of the tracking target by connecting the plurality of reference points created for the plurality of the image frames.

\* \* \* \* \*